Oct. 21, 1924.

L. D. SOUBIER

GLASS FEEDER

Filed April 6, 1922

1,512,373

INVENTOR
L. D. SOUBIER

By

HIS ATTORNEY

Patented Oct. 21, 1924.

1,512,373

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed April 6, 1922. Serial No. 549,978.

*To all whom it may concern:*

Be it known that I, LEONARD D. SOUBIER, a citizen of the United States, residing at Toledo, in the county of Lucas and State of Ohio, have invented new and useful Improvements in Glass Feeders, of which the following is a specification.

My invention has to do with glass feeding apparatus adapted to deliver individual masses or gobs of glass from a supply of molten glass, and relates more particularly to a regulating device by which the periodic discharge of glass through an outlet in the bottom of a container is regulated and controlled.

An object of the invention is to provide a regulator of this character which is simple in construction, effective and reliable in operation, which will accurately control the discharge of glass and which will possess certain advantages over the usual reciprocating type of plug feeder.

Other objects of the invention will appear hereinafter.

Figure 1:
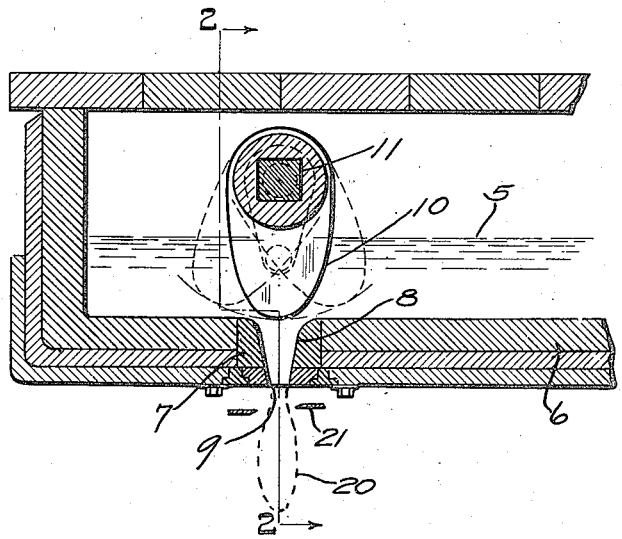
Figure 1 is a sectional side elevation of an apparatus constructed in accordance with my invention.
Figure 2:
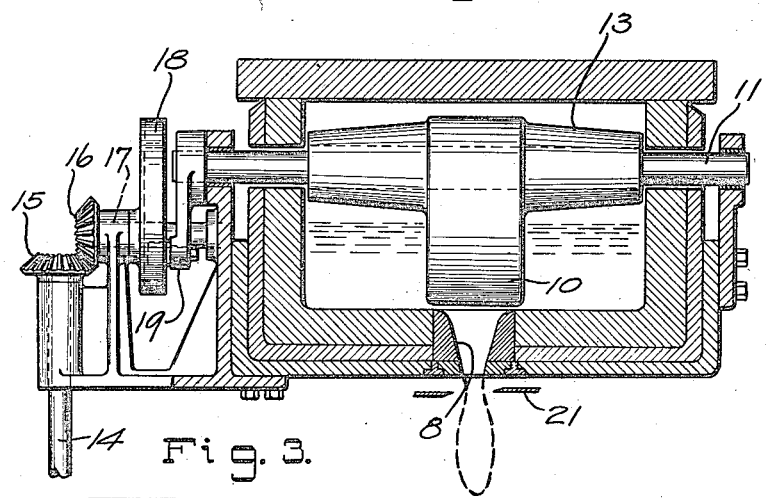
Figure 2 is a section at the line 2—2 on Figure 1.
Figure 3:
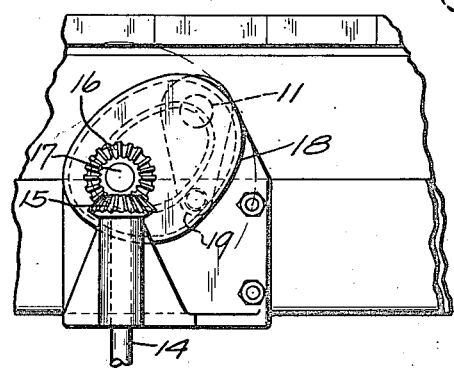
Figure 3 is a fragmentary view showing particularly the cam.

Molten glass 5 is supplied to a receptacle 6 which may be the usual forehearth or boot extension of a furnace. A bushing 7 in the floor of the boot is provided with a passageway 8 extending therethrough and terminating in an outlet orifice 9.

Within the boot is a regulator 10 adapted to oscillate over the discharge passage 8 to regulate and control the periodic discharge of glass. This regulator is in the form of a depending rock arm mounted on a rock shaft 11. The regulator 10 is made of fire clay or other refractory material which will withstand the heat and is provided with hub extensions 13 surrounding and protecting the shaft 11. The portion of the shaft within the boot is squared, as shown, to prevent relative rotation of said shaft and regulator. A continuously rotating vertical drive shaft 14 is connected through bevel gears 15 and 16 to a horizontal cam shaft 17 to which is secured a cam 18. The cam operates through a rock arm 19 fixed to the shaft 11 to oscillate the regulator 10.

As the regulator swings downward from either broken line position (Fig. 1) toward the orifice, it exerts an expelling action on the glass issuing through the outlet 9, causing the glass to be forced out in a compact mass or gob 20. About the time the regulator reaches its lowermost or vertical position a pair of shears 21 operates to sever the gob which may drop directly into a mold on a forming machine. As the regulator swings beyond the central position, it exerts a retarding force or upward pull on the glass in and below the passage 8, as the glass tenaciously adheres to the regulator. In this manner the movement of glass at the outlet may be arrested or reversed.

The shape of the cam may be varied to produce either a rapid or comparatively slow downward movement of the regulator and thereby vary the expelling force applied to the glass, with a corresponding variation in the size and shape of the expelled gob. The regulator may be caused to dwell for a greater or less length of time in its lowered position, thus regulating the length of time the flow is retarded. The rapidity of the upward movement of the regulator may also be varied to obtain a greater or less retractive action on the glass. All of these variations may obviously be effected by correspondingly varying the shape of the cam. If desired, the cam may be shaped to produce a slower movement of the regulator at one side of the orifice than at the other side and thereby produce a corresponding variation in the size of the gobs. That is to say, the feeder will then deliver comparatively large gobs alternating with comparatively small gobs. This is sometimes desirable for making articles of different sizes simultaneously on the same machine, or on different machines where the feeder delivers gobs alternately to two different machines. The drive shaft 14 is driven from or in synchronism with the glass forming machine or machines to which the gobs are fed, so that the operation of the regulator is synchronized with and in proper timed relation to the movements of the molds to gob receiving position.

The movement of the regulator 10 maintains a circulation of glass on all sides of the outlet orifice, thereby preventing the formation of dog metal or stagnant glass at the front end of the boot. That is to say, as the regulator swings rearwardly or to the right (Fig. 1) the glass in front thereof adheres to the regulator and is drawn rearwardly. This causes fresh glass to flow forward at both sides of the regulator. In this manner, fresh glass is caused to flow around the regulator and to the front end of the receptacle at each oscillation of the regulator.

Modifications may be resorted to within the spirit and scope of my invention.

What I claim is:

1. A container for molten glass having a discharge opening extending through the floor thereof, and a regulator to control the discharge of glass, said regulator comprising a body of refractory material extending downwardly in the glass above the opening, and means to oscillate said body.

2. A container for molten glass having a discharge opening extending through the floor thereof, a regulator to control the discharge of glass, said regulator comprising a body of refractory material extending downwardly in the glass above the opening, and means to oscillate said body about a horizontal axis and thereby swing the lower end thereof to and from a position directly over and adjacent to the outlet.

3. The combination of a container for molten glass having a discharge opening extending through the floor thereof, a body of refractory material extending into the glass over said opening, and means to periodically move said body laterally from a position at one side of the opening to a position over and in sufficiently close proximity to the opening to have a controlling effect on the issuing glass, then to a position at the other side of the opening and then to return it.

4. The combination of a container for molten glass having a discharge opening extending through the floor thereof, a regulating body of refractory material projecting downwardly in the glass directly over said opening, and automatic means to swing said body laterally to positions at opposite sides of the opening.

5. The combination of a container for molten glass having a discharge opening extending through the floor thereof, a regulator projecting downward in the glass directly over the opening, and means to oscillate said regulator about a horizontal axis and cause it to swing from and toward said opening and thereby exert an alternate retarding and expelling force on the glass issuing through said opening.

6. The combination of a furnace boot having an outlet opening in the floor thereof, a rock shaft extending horizontally through the side walls of the boot, a regulator comprising a body of refractory material mounted on said shaft and projecting downward into the glass directly over said opening, a drive shaft, a cam driven thereby, and a rock arm on said horizontal shaft actuated by the cam.

7. The combination of a container for molten glass provided with an outlet opening, a device to impel the glass through the outlet, and automatic means to periodically operate said device alternately on opposite sides of the outlet.

8. The combination of a container for molten glass provided with an outlet opening, a device to impel the glass through the outlet, and automatic means to move said device toward said outlet successively from different directions.

9. The combination of a container for molten glass provided with an outlet opening, a device to impel the glass through the outlet, and automatic means to move said device in downwardly inclined directions toward the outlet successively from different sides of the outlet.

Signed at Toledo, in the county of Lucas and State of Ohio, this 3d day of April, 1922.

LEONARD D. SOUBIER.